United States Patent [19]
Yeap et al.

[11] Patent Number: 6,052,420
[45] Date of Patent: Apr. 18, 2000

[54] ADAPTIVE MULTIPLE SUB-BAND COMMON-MODE RFI SUPPRESSION

[75] Inventors: Tet Hin Yeap; Pierre Donald Lefebvre, both of Ottawa, Canada

[73] Assignees: Northern Telecom Limited, Montreal; University of Ottawa, Ottawa, both of Canada

[21] Appl. No.: 09/078,509

[22] Filed: May 14, 1998

[30] Foreign Application Priority Data

May 15, 1997 [CA] Canada .................................. 2205686

[51] Int. Cl.[7] ............................. H04B 1/10; H04B 3/00
[52] U.S. Cl. .......................................... 375/346; 375/258
[58] Field of Search .................................... 375/285, 346, 375/222, 219, 257, 288, 258; 379/406; 333/18, 28 R

[56] References Cited

U.S. PATENT DOCUMENTS

| | | | |
|---|---|---|---|
| 3,705,365 | 12/1972 | Szabo et al. | 333/12 |
| 3,932,713 | 1/1976 | Fleuchaus et al. | 179/174 |
| 3,967,064 | 6/1976 | Sigworth | 179/1 |
| 4,247,821 | 1/1981 | Buselli et al. | 324/336 |
| 4,283,604 | 8/1981 | Chambers, Jr. | 179/70 |
| 4,535,323 | 8/1985 | Eccleston | 340/572 |
| 4,630,304 | 12/1986 | Borth et al. | 381/94 |
| 5,084,899 | 1/1992 | Harrington | 375/1 |
| 5,555,277 | 9/1996 | Lawrence et al. | 375/346 |
| 5,742,135 | 4/1998 | Horst | 375/242 |

FOREIGN PATENT DOCUMENTS

0 453 213 A2  4/1991  European Pat. Off. ........ H04B 15/00

*Primary Examiner*—Tesfaldet Bocure
*Attorney, Agent, or Firm*—Thomas Adams

[57] ABSTRACT

A noise suppression circuit for a two-wire communications channel comprises a hybrid device, for example a hybrid transformer or circuit, for providing a differential mode signal corresponding to a differential signal received from the two-wire channel. A summing device extracts from the two-wires of the channel a common mode signal and supplies it to a noise estimation unit which derives from the common mode signal an estimate of a noise level in at least one frequency band having a bandwidth considerably narrower than an operating bandwidth for the channel. The noise estimation unit adjusts the amplitude of the noise estimate to correspond to the residual noise in the differential mode signal and subtracts it from the differential mode signal to produce a noise-suppressed output signal. A noise detection and control unit scans the operating band, identifies a frequency band having an instant highest noise level, and sets the noise estimation unit to the detected noisy band. The noise estimation unit suppresses the noise in that band. In preferred embodiments, the noise estimation unit comprises several channels, each comprising a tunable filter, a phase shifter and an amplifier, and the noise detection and control unit sets the channels, in succession, to different frequency bands in descending order of noise level. The noise detection and control unit may cross-correlate the common mode signal and the noise-suppressed output signal and adjust the amplification of the noise estimation signal to reduce residual differential mode noise substantially to zero.

18 Claims, 5 Drawing Sheets

ADAPTIVE MULTIPLE SUB-BAND COMMON-MODE RFI SUPPRESSION

FIELD OF THE INVENTION

This invention relates to a method and apparatus for reducing interference in communications channels and is especially, but not exclusively, applicable to the suppression of common mode noise, including radio frequency interference, in digital subscriber loops of telephone systems.

BACKGROUND OF THE INVENTION

A balanced digital subscriber loop comprising a twisted wire pair carries both differential and common mode currents induced by the signal and noise sources, respectively. In a perfectly balanced loop, the common mode currents will not interfere with the differential current (information signal). However, when bridge taps, poorly twisted cable, and so on, cause the circuit to be unbalanced, longitudinal current injected by external noise sources will be converted into differential current at the receiver and detected as noise. Such noise can lead to errors by introducing jitter in timing extraction circuits or by causing false pulse detection. In digital loops, common mode noise can be conveniently categorized into the following: Impulse noise, Radio Frequency Interference (RFI) and Crosstalk Noise. With the trend towards higher bit rates in the loops, radio interference, typically caused by radio stations in the vicinity and hence transmitting on certain frequencies with a relatively narrow bandwidth, is assuming greater significance.

When telephone subscriber loops operated at relatively low frequencies, perhaps 3,000 Hz. or 4,000 Hz., interference could be dealt with adequately by using twisted wire cable, which helps to cancel out any induced interference, and by means of hybrid transformers. With the introduction of VDSL (Very high speed Digital Subscriber Loops) and ADSL (Asymmetric Digital Subscriber Loops), the frequency of operation is approaching the radio frequency bands and the aforementioned balancing of the cable is no longer sufficient to reduce the interference. As a result, common mode noise increases.

Various techniques, other than such balancing, are known for reducing interference or noise in a communication channel. For example, U.S. Pat. No. 5,555,277, discloses a technique for cancelling common mode switching noise to achieve reduced error rates in a local area network. This technique involves gain controllers at both transmitter and receiver ends to maintain signal integrity during transmission. In addition, noise cancellation at the receiver is performed by generating primary and inverted copies of the received signal, amplifying both primary and inverted signals, and then summing them to cancel the induced common mode noise. This technique is not entirely satisfactory because it addresses common mode noise within the transceiver but not common mode noise in the transmission channel itself.

To mitigate common mode noise on a pair of signal conductors, the system disclosed in U.S. Pat. No. 3,705,365 issued Dec. 5, 1972 uses a two conductor shielded cable, a three-winding transformer, and a bipolar differential amplifier. The common mode signal from the cable shield is used to cancel the common mode noise using the third winding in the transformer. This technique is not entirely suitable for twisted wire transmission lines, such as telephone subscriber loops.

U.S. Pat. No. 4,283,604 discloses an electronic hybrid in the form of a current source circuit with common mode noise rejection for a two-wire transmission system. The circuit provides an electronic interface for coupling signals with a transmission line and operates to cancel or negate the effect of unwanted impedance on the line, thereby improving common mode impedance across the pair and enhancing the common mode rejection to noise ratio in the two-wire system. Like a conventional hybrid transformer, this electronic hybrid will not operate satisfactorily when the line is not balanced, especially when the line is a relatively long telephone subscriber loop.

European patent application number 0 453 213 A2 discloses a radio receiver in which an adaptive notch filtering approach is used to reduce interference in a radio frequency received signal carrying digital data at 2.4 kilobits per second using a 3 to 30 MHz r.f. carrier. The adaptive notch filter is implemented using frequency domain analysis of quantized data to detect interference by comparing the received signal frequency spectrum with a known spectrum template. Any frequency band with higher power than the reference template is considered to have interference. A programmable notch filter is then tuned to nullify the signal power in the respective frequency band. Unfortunately, the received signal in the selected band is cancelled along with the interference, resulting in an undesirable loss of signal information. A further disadvantage is that the technique also requires the interference rejection filter to be trained, which entails the transmission of a training sequence periodically between transmissions of the data stream, thus reducing overall transmission efficiency.

Hence, none of these various techniques constitutes a satisfactory way of reducing common mode noise in subscriber loops operating at the proposed very high speed levels of VDSL or ADSL. In T1E1.4/96-084 dated Apr. 18, 1996, and at a VDSL workshop at IEEE Globecom, Nov. 18, 1996 in London, England, John Cioffi and John Bingham proposed doing so by measuring the voltage between ground and the centre tap of the usual hybrid transformer at the end of the subscriber loop and extracting a signal representing common mode noise. Cioffi et al. proposed to filter this common mode noise signal using an adaptive wide band filter to provide a radio frequency noise estimate and subtract it from a differential signal obtained from the secondary of the hybrid transformer to produce an error signal for tuning the adaptive filter to reduce that error signal to zero. The circuit can only tune the filter when there are quiet periods in the received signal. This is not entirely satisfactory because it involves timing to ensure that the quiet periods are detected. Because noise patterns may change, the filter must be tuned frequently, which increases overhead, reducing the efficiency of the transmission. Also, the adaptive filter has to have a bandwidth at least as wide as the bandwidth of the received signal which, in the case of VDSL, might be from zero to about 10 Mz. Such a filter would be complex and expensive to make. Moreover, the arrangement might not work in places where a proper ground cannot be located, such as a rocky region.

An object of the present invention is to eliminate or at least mitigate the disadvantages of the foregoing known techniques and provide a noise suppression arrangement that is better adapted to the reduction of common mode noise in two-conductor communications channels, such as twisted wire subscriber loops.

SUMMARY OF THE INVENTION

According to one aspect of the present invention, noise suppression apparatus for a two-conductor communications channel comprises:

(i) a hybrid device connected to the channel for providing a differential mode signal corresponding to a differential signal received from the channel, (ii) a device for extracting from the channel a corresponding common mode signal, (iii) a noise estimation unit responsive to the common mode signal and a frequency control signal for deriving from the common mode signal a noise estimate signal representing a common mode noise level in a selected frequency band having a bandwidth considerably narrower than an operating bandwidth of said differential signal, (iv) means for providing a noise-suppressed output signal as the difference between the differential mode signal and the noise estimate signal; and (v) noise detection and control means responsive to said common mode signal for detecting within the operating bandwidth a narrow frequency band wherein instant noise level is higher than in other parts of the operating bandwidth, such narrow frequency band having a bandwidth significantly less than an operating bandwidth of said differential signal, and generating said frequency control signal for adjusting said noise estimation means so that said selected frequency band corresponds to that of the instant highest noise signal.

The noise estimation unit may comprise means responsive to a second control signal for adjusting the noise estimation signal so as to correspond to the differential mode noise in the differential mode signal, and the noise detection and control means may further comprise means responsive to the common mode signal and the noise-suppressed output signal for generating said second control signal in dependence upon a comparison between the common mode signal and the noise-suppressed output signal when the noise estimation means is set to the selected frequency band.

In comparing the common mode signal and the noise-suppressed output signal, the means for generating the second control signal preferably performs cross-correlation between the common mode signal and the noise-corrected signal to determine whether or not the noise estimation signal has substantially cancelled the differential noise in the output signal.

In preferred embodiments of the invention, the noise estimation unit comprises a plurality of tunable narrowband bandpass filter units, the noise detection and control means provides a plurality of frequency control signals, each for a different one of the tunable narrowband bandpass filter units, each filter unit is responsive to a respective said frequency control signal to supply a respective one of a plurality of components of said noise estimation signal, and the noise detection and control unit is arranged to scan said operating bandwidth a plurality of times and, after each scan, adjust a different one of the frequency control signals to adjust the corresponding one of the filter units to the noisiest band detected during that scan.

According to a second aspect of the invention, noise suppression apparatus for a two-conductor communications channel comprises:

(i) a hybrid device connected to the channel for providing a differential mode signal corresponding to a differential signal received from the channel, (ii) a device for extracting from the channel a corresponding common mode signal, (iii) a noise estimation unit comprising a plurality of noise estimation means for deriving a corresponding plurality of noise estimate component signals for respective ones of a plurality of selected frequency bands, each noise estimation means being responsive to the common mode signal and a corresponding one of a plurality of frequency control signals for deriving from the common mode signal a noise estimate signal component representing a common mode noise level in a selected frequency band having a bandwidth considerably narrower than an operating bandwidth of said differential signal, (iv) means for summing the noise estimate signal components to provide a noise estimate signal;

(v) means for providing a noise-suppressed output signal as the difference between the differential mode signal and the noise estimate signal; and (vi) noise detection and control means responsive to said common mode signal for scanning the operating bandwidth a plurality of times to detect, for each scan, that narrow frequency band wherein instant noise level is higher than in other parts of the operating bandwidth, each such narrow frequency band having a bandwidth significantly less than an operating bandwidth of said differential signal, and generating for each scan one of said frequency control signals for adjusting the corresponding one of said noise estimation means so that the corresponding said selected frequency band corresponds to that of the instant highest noise signal.

According to a third aspect of the invention, a method of suppressing noise in a signal received from a two-conductor communications channel comprises the steps of:

(i) using a hybrid device connected to the channel to provide a differential mode signal corresponding to a differential signal received from the channel, (ii) extracting from the channel a corresponding common mode signal, (iii) responsive to the common mode signal and a frequency control signal, deriving from the common mode signal a noise estimate signal representing a common mode noise level in a selected frequency band having a bandwidth considerably narrower than an operating bandwidth of said differential signal, (iv) providing a noise-suppressed output signal as the difference between the differential mode signal and the noise estimate signal; and (v) responsive to said common mode signal, detecting within the operating bandwidth a narrow frequency band wherein instant noise level is higher than in other parts of the operating bandwidth, such narrow frequency band having a bandwidth significantly less than an operating bandwidth of said differential signal, and generating said frequency control signal for adjusting said selected frequency band to correspond to that of the instant highest noise signal.

According to a fourth aspect of the invention, a method of suppressing noise in a signal received from a two-conductor communications channel comprises the steps of:

(i) using a hybrid device connected to the channel, a differential mode signal corresponding to a differential signal received from the channel, (ii) extracting from the channel a corresponding common mode signal, (iii) responsive to the common mode signal and each of a plurality of frequency control signals, deriving a plurality of noise estimate signal components each representing a common mode noise level in a selected frequency band having a bandwidth considerably narrower than an operating bandwidth of said differential signal, (iv) summing the noise estimate signal components to provide a noise estimate signal;

(v) providing a noise-suppressed output signal as the difference between the differential mode signal and the noise estimate signal; and (vi) scanning the common mode signal over the operating bandwidth a plurality of times and detecting, for each scan, that narrow frequency band wherein instant noise level is higher than in other parts of the operating bandwidth, each such narrow frequency band having a bandwidth significantly less than an operating bandwidth of said differential signal, and generating for each scan one of said frequency control signals for adjusting the corresponding said selected frequency band to correspond to that of the instant highest noise signal.

BRIEF DESCRIPTION OF THE DRAWINGS

Embodiments of the invention will now be described by way of example only and with reference to the accompanying drawings in which.

DETAILED DESCRIPTION OF PREFERRED EMBODIMENTS

In the drawings, identical or corresponding components in the different Figures have the same reference numbers.

Figure 1:
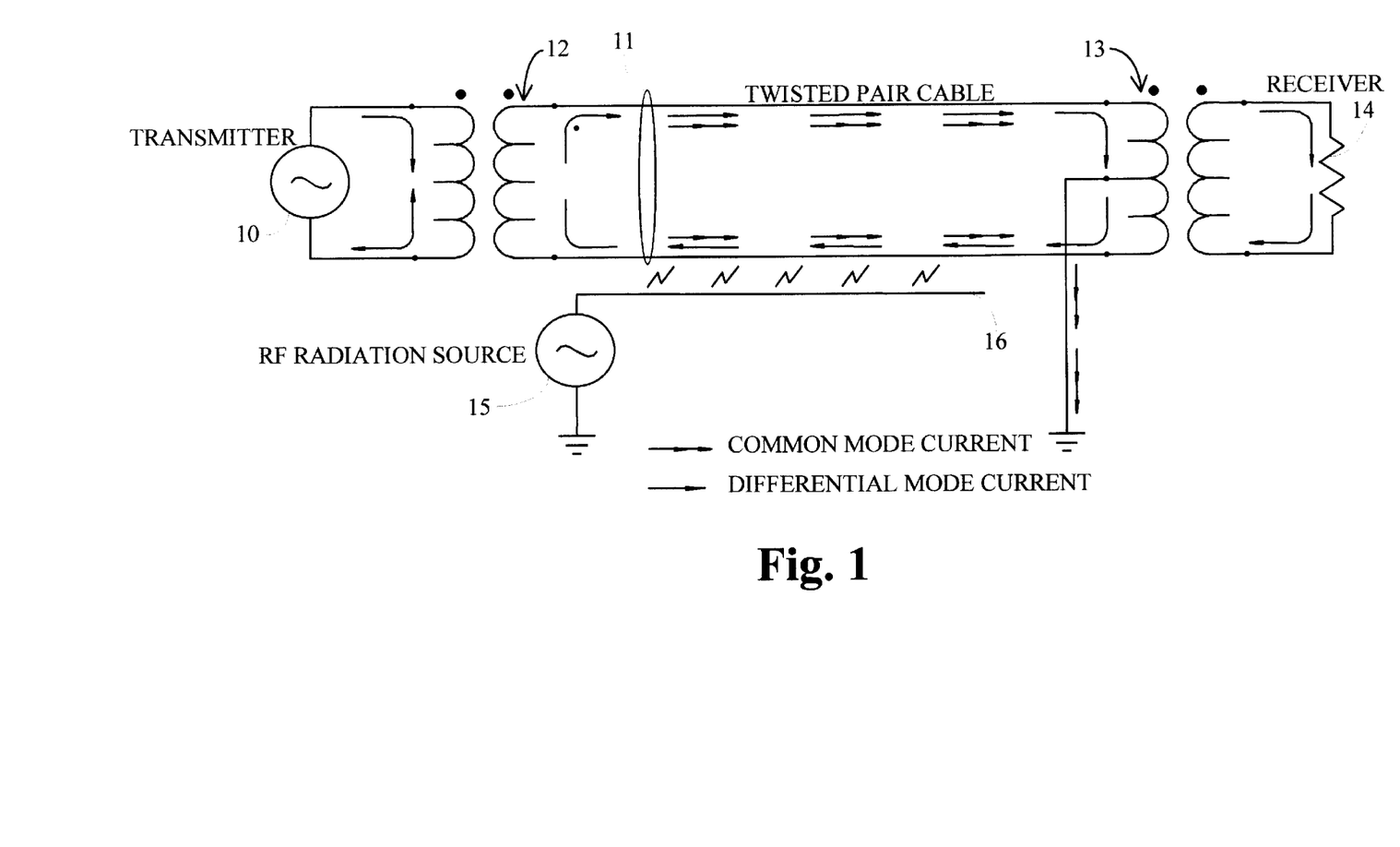
FIG. 1 is a schematic diagram of a two-wire communications channel showing the paths of common mode and differential mode currents and the introduction of radio frequency interference or noise from an RF radiation source.

Referring to FIG. 1, a transmitter 10 is shown connected to one end of a twisted pair subscriber loop 11 by way of a hybrid or balance transformer 12. A similar transformer 13 connects the far end of the loop 11 to a receiver 14. Injection of radio frequency noise into the subscriber loop 11 is represented by an RF source 15 feeding an antenna 16 which couples radio frequency signals, as noise, into the subscriber loop 11. The injected noise signals are injected as common mode signals but are converted into differential mode current at the receiver 14 and detected as noise.

Figure 2:
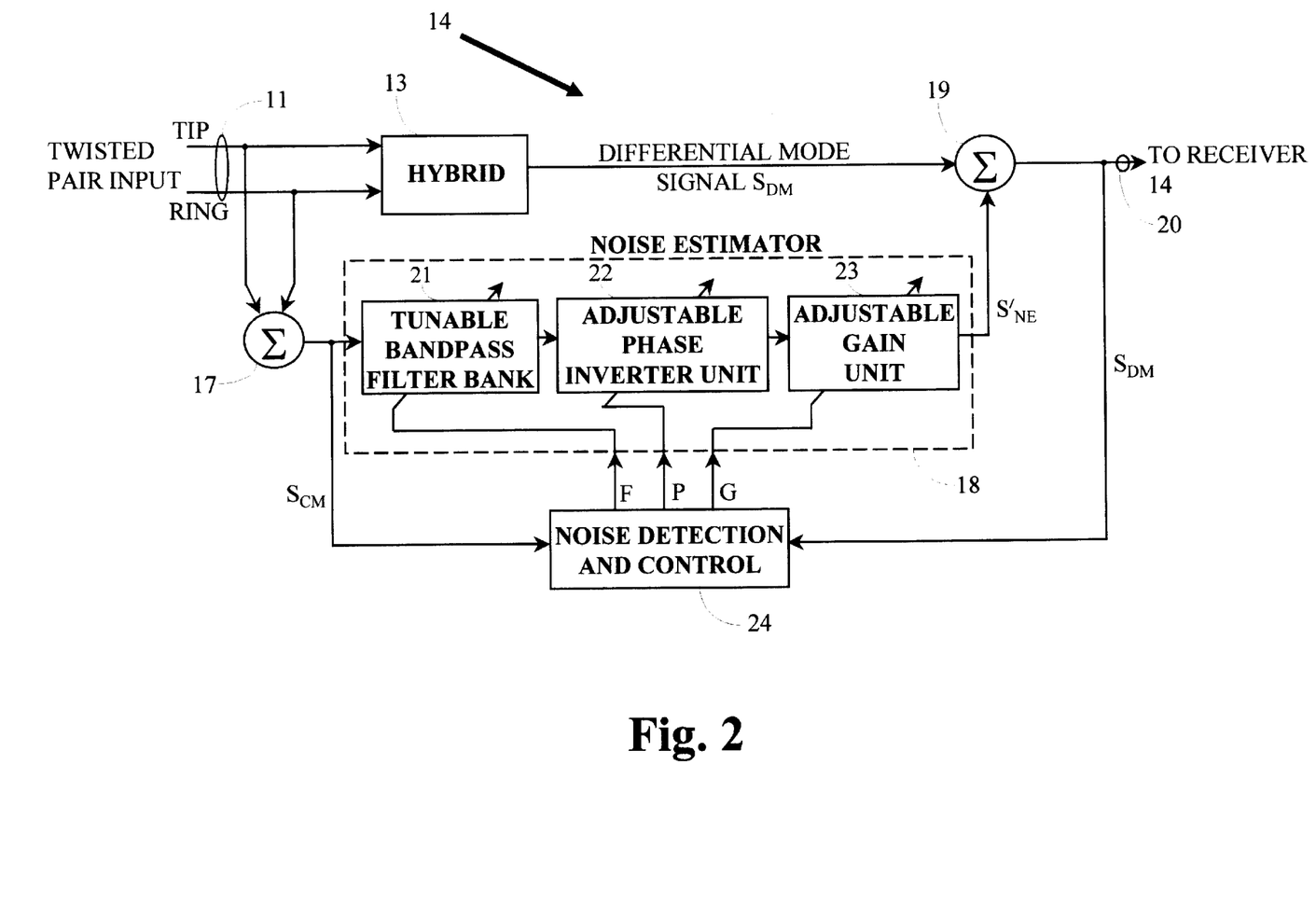
FIG. 2 is a simplified schematic block diagram of a noise suppression circuit according to the present invention and comprising a noise detection and control unit and a noise estimation unit.

Referring to FIG. 2, in a receiver 14 according to a first embodiment of the invention, the TIP and RING of the twisted wire subscriber loop 11 are connected to respective inputs of a hybrid circuit 13. The signal at the input of hybrid 13 comprises a differential signal coupled with the common mode signal. The common mode signal is extracted from the twisted wire pair 11 by a summer 17, respective inputs of which also are connected to the TIP and RING of the subscriber loop 11. The output of the summer 17 is connected to a noise estimator circuit 18 which produces noise estimate signal that is substantially phase-inverted and supplies it to one input of a second summer 19. The other input of summer 19 is connected to the output of hybrid 13. The second summer 19 adds the differential mode signal extracted by the hybrid 13 to the "inverted" noise estimate signal, thereby subtracting common mode noise from the differential mode signal, and supplies the resulting signal to an output port 20 for supply to the receiver 14 (not shown in FIG. 2). The differential mode signal output from summer 19 will be improved in that it will have a higher Signal to Noise Ratio (SNR).

Common mode noise is estimated by adding the in-phase TIP signal and anti-phase RING signal in a twisted pair cable with respect to ground reference. It should be noted that the common mode signals in both the TIP wire and the RING wires are in phase with each other. Therefore, the common mode signal is extracted while the differential mode signal is cancelled out when the TIP and RING signals are added at summer 17. The extracted common mode signal from summer 17 is then processed by the noise estimator 18.

Within the noise estimator 18, the common mode signal is filtered in adjustable bandpass filter bank 21 and phase-inverted by adjustable phase inverter unit 22. The resulting signal is scaled by an adjustable gain unit 23 which compensates for signal loss in the adjustable phase inverter 22 and other components in or preceding the noise estimator 18. The output of the adjustable gain unit 23 is the phase-inverted noise estimate signal which is combined with the differential mode output of hybrid 13.

The respective output signals from the summer 17 and the summer 19 also are supplied to a noise detection and control circuit 24 which uses them to derive control signals for controlling the tunable bandpass filter bank 21, adjustable phase inverter unit 22 and adjustable gain unit 23.

The noise detection and control unit 24 performs spectral analysis upon the common mode signal to locate narrowband noise signals and adjusts the centre frequencies of the individual bandpass filters in bandpass filter bank 21 to coincide substantially with the centre frequencies of the narrowband noise signals. The control unit 24 also controls the amount of phase shift provided by adjustable phase inverter 22. The phase inverter 22 will not necessarily provide exactly 180 degrees of phase shift but rather, to compensate for the nonlinear phase delays inherent in hybrid 13, and the summer 17 and filter bank 21, will provide sufficient phase shift for the noise estimation signal to be substantially 180 degrees out of phase relative to the differential mode noise in the differential mode signal at the summer 19.

The control unit 24 also controls the adjustable gain unit 23 so as adjust the amplitude of the noise estimate signal to the appropriate level to cancel the differential mode noise in the differential mode signal.

Typically, the controller 24 can be implemented by a low speed microcontroller because the real-time requirement to perform the above adaptive computations is low.

Figure 3:
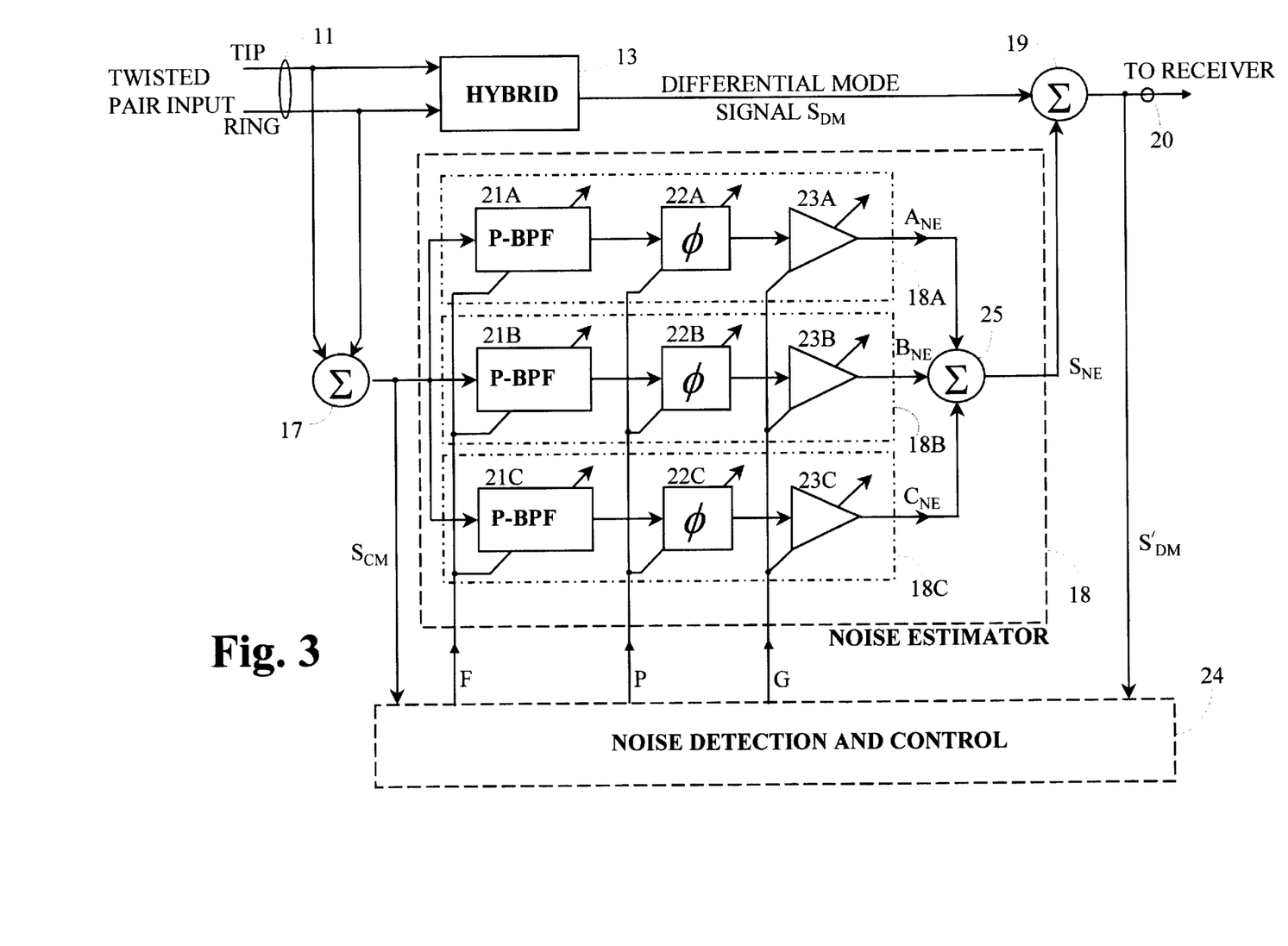
FIG. 3 is a block schematic diagram of the circuit of FIG. 2 but showing the noise estimation unit in more detail.

The noise estimator 18 will now be described in more detail with reference to FIG. 3. The noise estimator 18 comprises several identical channels. The number of channels depends upon the number of narrowband common mode noise bands that need to be suppressed. To simplify the description, however, only three channels are shown, designated A, B and C. Identical components in the three channels have the same reference numbers but with the channel identifier as a suffix.

The three channels comprise tunable narrowband bandpass filters 21A, 21B and 21C, respectively, each having a bandwidth of, for example, 100 kHz. The centre frequency of each bandpass filter can be adjusted to match the centre frequency of narrowband noise detected by performing spectral analysis of the common mode signal in the adaptive controller 24, as will be discussed in more detail later. As a result, the output signals from each of the bandpass filters 21A, 21B and 21C will each be a narrowband component of the common mode noise.

Each of the bandpass filters 21A, 21B and 21C has its output connected to the input of a respective one of three adjustable phase shifters 22A, 22B and 22C. Differential mode and common mode signals propagate differently in the twisted wire pair 11 and the hybrid 13. The phase relationship between the two propagation modes is not constant with respect to frequency; rather the difference in phase between the two propagation modes increases with frequency. Beyond a few megahertz, multiple periods of phase delay are exhibited between the common mode and differential mode. Therefore, the adjustable phase shifters 22A, 22B and 22C must be capable of realigning the common mode signal to the differential mode noise in the differential mode signal such that there is a 180 phase difference between the signals in the frequency bandwidth of the corresponding noise suppression channel A, B or C.

Each of the phase shifters 22A, 22B and 22C has its output connected to the input of a respective one of three amplifiers 23A, 23B and 23C, respectively, which constitute the adjustable gain unit 23. The amplitude of the differential mode noise is dependent on the loop balance, more particularly dependent upon the amount of common mode noise which couples via the hybrid 13 into the differential mode signal. Therefore, the common mode signal is scaled to match the amplitude of the differential noise by adaptively controlling the gain of the adjustable gain units 23A, 23B and 23C. It should be noted that better cable, such as data grade cable, exhibits better noise immunity, so a smaller portion of the common mode noise will couple into the differential mode path.

The phase-inverted and scaled common mode noise estimate signals from the amplifiers 23A, 23B and 23C, respectively, are combined by a third summer 25 and the resulting combined phase-inverted common mode noise estimate signal supplied, as the output of noise estimator 18, to the summer 19, which adds the combined phase-inverted common mode noise estimate signal to the differential mode signal containing the "common mode" residual noise, thereby effecting suppression of the residual noise.

Figure 4:
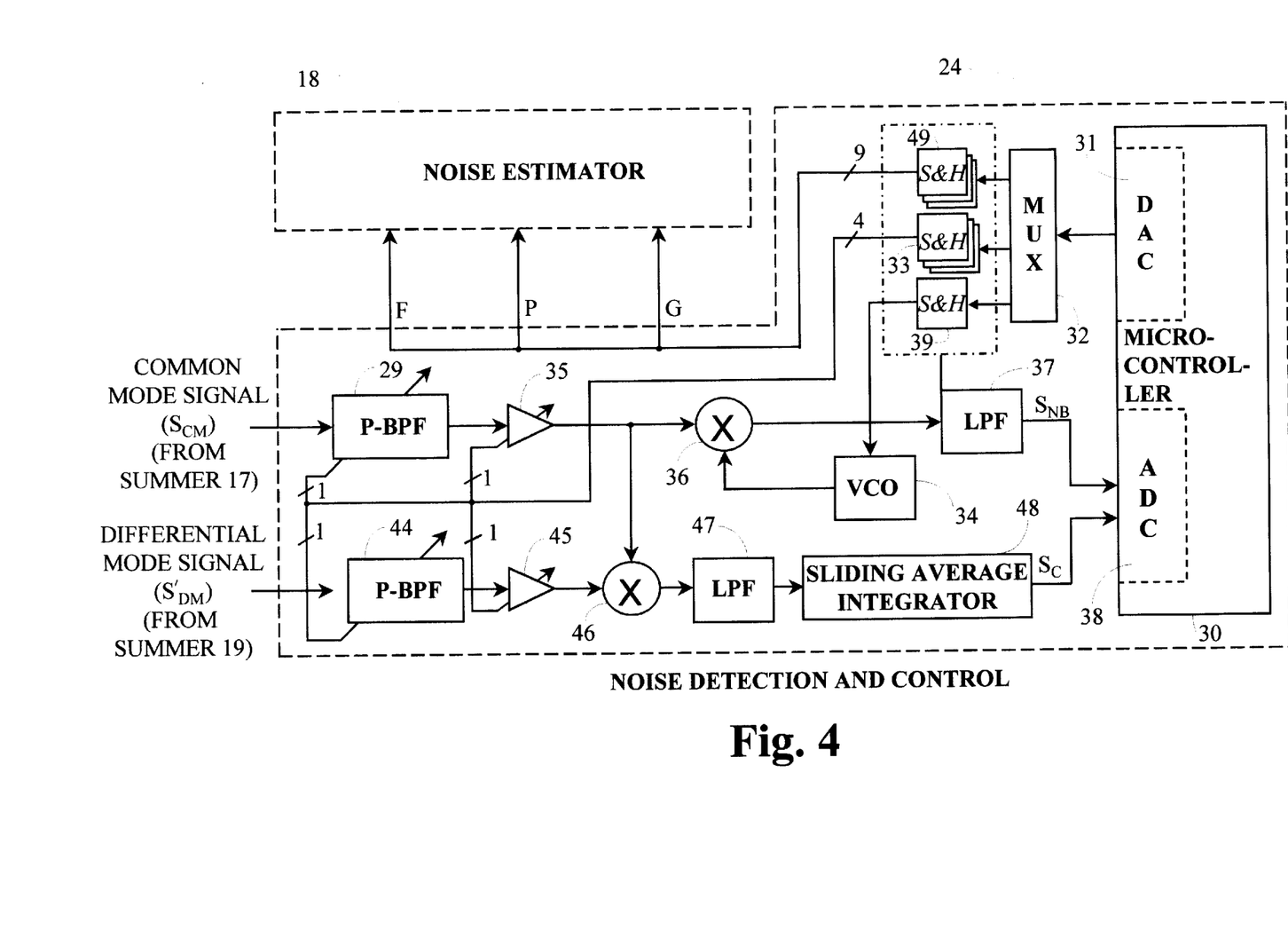
FIG. 4 is a schematic block diagram of the circuit of FIG. 2 but showing the noise detection and control unit in more detail.

The noise detection and control unit 24 will now be described in more detail with reference to FIG. 4. Briefly, the control unit 24 detects the residual noise at the output port 20 to modify adaptively the parameters of each of the channels A, B and C of the multichannel noise estimator 18 to minimize the noise at output port 20. Such noise detection involves computing the average of the cross-correlation between the differential and common mode signals, as will be discussed later.

Spectral analysis of the common mode signal so as to estimate residual noise in the differential mode signal could be performed simply by computing a Fourier transform of the common mode signal, but such an approach requires intensive computations and thus a high speed processor. To avoid the need for a high speed processor, spectral analysis is accomplished by sweeping a narrowband bandpass filter 29 incrementally throughout the entire frequency band of the digital subscriber loop 11, i.e. the bandwidth of the transmitted signal spectrum. As shown in FIG. 4, first bandpass filter 29 has its input connected to the output of summer 17 to receive the common mode signal (SCM). Second bandpass filter 44 has its input connected to the output of summer 19 to receive the noise-corrected differential mode signal (SDM). A control signal for causing the filter 29 to sweep the required frequency band are supplied by a microcontroller 30, the digital output of which is converted to an analog control signal by a digital-to-analog converter 31. The analog signal from D-to-A converter 31 is supplied to the filter 29 by way of multiplexer 32 and one at a set of sample-and-hold circuits 33.

The common mode noise signal comprises a passband signal which is converted into a baseband signal by demodulating it with a carrier signal from a voltage controlled oscillator 34. Thus, the common mode signal from the output of first passband filter 29 is amplified by variable-gain amplifier 35 and supplied to a multiplier 36 which mixes it with the signal from the VCO 34. The resulting signal is filtered by low pass filter 37 to extract the baseband signal which then is converted to a digital signal by analog-to-digital converter 38 at the input to microcontroller 30. The frequency of VCO 34 is controlled by the microcontroller 30 by way of D-to-A converter 31, multiplexer 32 and a sample-and-hold circuit 39. The microcontroller 30 adjusts the frequency of VCO 34 so that the common mode signal will fit into the frequency range of the A-to-D converter 38.

When the system is first switched on, the microcontroller 30 will cause the common mode signal (SCM) passband filter 29 to scan the entire frequency range of signal received from the subscriber the loop 11. The microcontroller 30 will record the centre frequency of the narrowband having the largest amplitude and generate a control signal, as described before, to adjust the first bandpass filter 21A in the noise estimator 18 to set it to the same centre frequency.

After a suitable interval has elapsed to allow for the bandpass filter 21A, phase shifter 22A and amplifier 23A to "settle", the microcontroller 30 performs cross-correlation between the common mode signal SCM and the differential mode signal SDM to determine whether or not the gain of amplier 23A needs to be adjusted. As mentioned previously, there may be losses in the hybrid 13 and in the various components of the noise estimator 18. Consequently, the amplitude of the common mode noise estimate signal from channel A may be greater, or less than that required for cancellation of the residual noise in the differential mode signal.

The cross-correlation is performed while the bandpass filter 21A and 29 set to substantially the same centre frequency.

The microcontroller 30 provides further control signals by way of D-to-A converter 31, multiplexer 32, and sample-and-hold circuits 33 to increment the frequency of tunable filter 29 in steps which are equal to the passband of the tunable filters 21A, 21B, and 21C in the noise estimation unit 18, i.e. in steps of 100 Khz. At each 100 Khz interval, the microcontroller 30 measures and stores in memory the power level of the received signal. When the microcontroller 30 has completely scanned the entire frequency range, it selects the highest power value recorded and then, by way of D-to-A converter 31, multiplexer 32 and the appropriate one of three sample-and-hold circuits 49, sets the first tunable bandpass filter 21A in the noise estimation unit 18 to the centre frequency of that narrowband.

While the first bandpass filter 21A was being set to the highest noise band, the differential mode signal path was free running. Once the first tunable filter 21A has been set or locked to its noise narrowband, and begins to suppress the noise in that band, the noise component in the differential mode signal is reduced. In the noise detection and control unit 24, this differential mode signal is passed through second bandpass filter 44, amplifier 45 and multiplier 46 in the SDM path (FIG. 4). The multiplier 46 will perform cross-correlation by multiplying the common mode signal (SCM) by the differential mode signal (SDM), producing a residual signal which is rather noisy. A low pass filter 47 connects to the output of multiplier 46 and removes high frequency components or harmonics from the residual signal. A sliding average integrator 48 then extracts the DC component from the filtered signal and applies it to the A-to-D converter 38. Amplifier 45 simply adjusts the amplitude of the signal from filter 44 to a suitable level for processing by the A-to-D converter 38. The microcontroller 30 determines whether the residue tracks the noise and whether its amplitude is positive or negative, indicating that the amplitude of the differential mode signal noise component is smaller or greater than the common mode noise component extracted from TIP and RING via summer 17. By way of D-to-A converter 31, multiplexer 32 and sample-and-hold circuits 49, the microcontroller 30 adjusts the phase shifter 22A and amplifier 23A in channel A of the multi-channel noise estimator 18, both to correct phase differences between the signals and to adjust amplitude. The adjustment of phase and gain will continue until the residual signal is substantially zero. At this point, the first filter channel A is correctly set to the first noisy narrow band.

Thus, radio frequency interference (RFI) is detected by sweeping the entire frequency band of the common mode signal while differential mode noise is detected by sweeping the cross-correlation between differential and common mode signals.

The microcontroller 30 then repeats the process, looking for the next noisiest narrow band. Hence, the microcontroller 30 scans tunable filter 29 to detect the second-noisiest narrow band and sets the second tunable filter channel components 21B, 22B and 23B to the second noisiest band. It should be noted that, at this time, the first tunable filter channel A will have suppressed the first noisiest band, so the microcontroller 30 will again look for the noisiest narrow band in the operating range at that time. Again, once the filter 22B has been set to the centre frequency of the second noisy band, the microcontroller 30 performs cross-correlation to adjust the phase and gain in channel B so as to reduce the residual differential noise mode substantially to zero.

The process is repeated once more to set the third channel C to the third-noisiest band, at which point all of the tunable filter channels A, B and C will have been set to respective noisy bands selected in descending order of noise power.

Assuming an operating frequency range from zero to 10 MHz, and tunable filters 21A, 21B and 21C having bandwidth of 100 kHz bandwidth, it is expected that perhaps three tunable filters will be sufficient for most applications involving subscriber loops using twisted wire pairs. This recognises that the nature of common mode noise in these systems tends to be concentrated in certain bands, perhaps because it is interference from a neighbouring radio station. Nevertheless, it will be appreciated that a greater number of bandpass filters could be used if desired.

Figure 5:
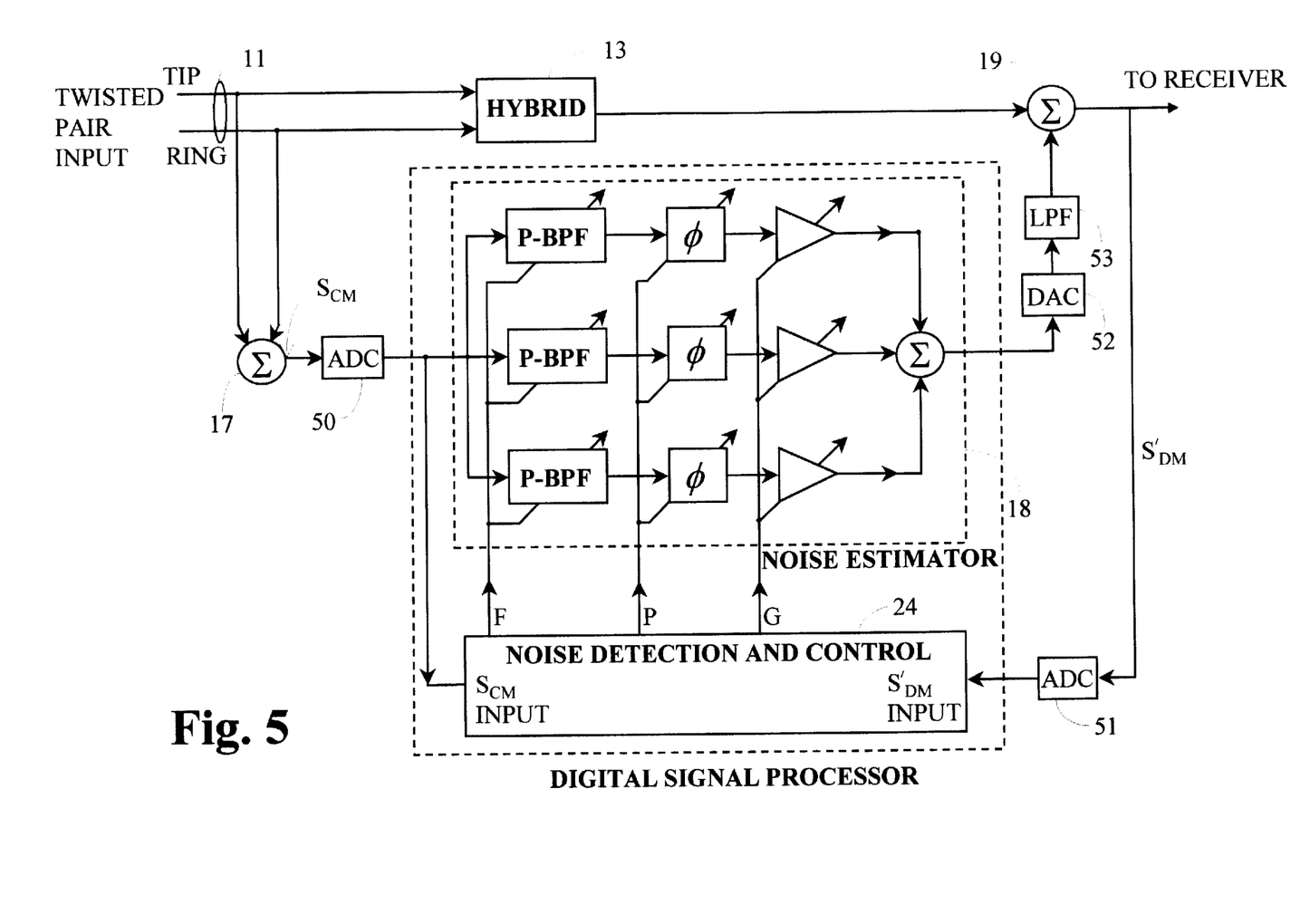
FIG. 5 illustrates a second embodiment suitable for implementation using a digital signal processor.

It would be possible to implement both the noise estimator 18 and the noise detection and control unit 24 digitally, perhaps using a digital signal processor. As illustrated in FIG. 5, in order to permit such a digital implementation, the signals into and out of the noise estimator 18 and noise detection and control unit 24 would need to be converted. Thus, a first analog-to-digital converter 50 is inserted at the output of summer 17, and a second analog-to-digital converter 51 between the output of summer 19 and the SDM input of noise detection and control unit 24. A digital-to-analog converter 52 and low pass filter 53 are inserted between the output of the noise estimator 18 and the corresponding input of summer 19. When implementing the noise detection and control unit 24 digitally, a Fast Fourier Transform process will be used to produce the control signals for noise estimator 18. More particularly, the bandpass filters 21A, 21B and 21C would be combined and the necessary coefficients loaded into them periodically. When the noise estimator 18 is implemented digitally, it is also possible for the microcontroller 30 to adjust the bandwidth of each of the filters 21A, 21B and 21C to approximate more closely the bandwidth of the corresponding narrowband noise signal. The detailed implementation of the digital noise estimator and digital noise detection and control unit will not be described in detail since the substitution of digital counterparts for the analog sample-and hold components, VCO, analog filters, multipliers and so on would be obvious to a person skilled in this art.

In many cases, the RFI will be at fixed frequencies, perhaps because it is from a local AM radio station. In such a case, the bandpass filter(s) could be tuned manually following installation, rather than adaptively as described hereinbefore.

Embodiments of the invention permit dominant common mode noise such as RFI to be reduced significantly. The noise reduction in a twisted-pair cable will improve the Signal-to-Noise ratio, thereby increasing the reach of digital subscriber loop modems or allowing higher signalling rates in the same cable.

What is claimed is:

1. Apparatus for suppressing noise in signals received from a two-conductor communications channel comprising:

(i) a hybrid device connected to the channel for providing a differential mode signal corresponding to a differential signal received from the channel, (ii) a device for extracting from the channel a corresponding common mode signal, (iii) a noise estimation unit responsive to the common mode signal and a frequency control signal for deriving from the common mode signal a noise estimate signal representing a common mode noise level in a selected frequency band having a bandwidth considerably narrower than an operating bandwidth of said differential signal, (iv) means for providing a noise-suppressed output signal as the difference between the differential mode signal and the noise estimate signal; and (v) noise detection and control means responsive to said common mode signal for detecting within the operating bandwidth a narrow frequency band wherein instant noise level is higher than in other parts of the operating bandwidth, such narrow frequency band having a bandwidth significantly less than an operating bandwidth of said differential signal, and generating said frequency control signal for adjusting said noise estimation means so that said selected frequency band corresponds to that of the instant highest noise signal.

2. Apparatus according to claim 1, wherein the noise estimation unit comprises means responsive to a second control signal for adjusting the noise estimation signal so as to correspond to the differential mode noise in the differential mode signal, and the noise detection and control means further comprises means responsive to the common mode signal and the noise-suppressed output signal for generating said second control signal in dependence upon a comparison between the common mode signal and the noise-suppressed output signal when the noise estimation means is set to the selected frequency band.

3. Apparatus according to claim 2, wherein the means for generating the second control signal performs cross-correlation between the common mode signal and the noise-suppressed output signal to determine whether or not residual differential noise is present in the noise-corrected output signal and adjusts the second control signal so as to reduce any said residual noise.

4. Apparatus according to claim 2, wherein the means responsive to the second control signal comprises variable-gain amplifier means for adjusting amplitude of the noise estimation signal, and the noise estimation unit further comprises phase-shifting means for adjusting the phase of the noise estimation signal in response to a third control signal, the noise detection and control unit further comprising means for providing said third control signal in dependence upon said comparison.

5. Apparatus according to claim 3, wherein the means responsive to the second control signal comprises variable-gain amplifier means for adjusting amplitude of the noise estimation signal, and the noise estimation unit further comprises phase-shifting means for adjusting the phase of the noise estimation signal in response to a third control signal, the noise detection and control unit further comprising means for providing said third control signal in dependence upon said comparison.

6. Noise suppression apparatus for a two-conductor communications channel comprising:
(i) a hybrid device connected to the channel for providing a differential mode signal corresponding to a differential signal received from the channel,
(ii) a device for extracting from the channel a corresponding common mode signal,
(iii) a noise estimation unit comprising a plurality of noise estimation means for deriving a corresponding plurality of noise estimate component signals for a plurality of selected frequency bands, respectively, each noise estimation means being responsive to the common mode signal and a corresponding one of the plurality of frequency control signals for deriving from the common mode signal a noise estimate signal component representing a common mode noise level in a selected frequency band having a bandwidth considerably narrower than an operating bandwidth of said differential signal,
(iv) means for summing the noise estimate signal components to provide a noise estimate signal;
(v) means for providing a noise-suppressed output signal as the difference between the differential mode signal and the noise estimate signal; and
(vi) noise detection and control means responsive to said common mode signal for scanning the operating bandwidth a plurality of times to detect, for each scan, that narrow frequency band wherein instant noise level is higher than in other parts of the operating bandwidth, each such narrow frequency band having a bandwidth significantly less than an operating bandwidth of said differential signal, and generating for each scan one of said frequency control signals for adjusting the corresponding one of said noise estimation means so that the corresponding said selected frequency band corresponds to that of the instant highest noise signal, the arrangement being such that the noise estimation means are set to their respective frequency bands in succession.

7. Apparatus according to claim 6, wherein the plurality of noise estimation means comprise a plurality of tunable narrowband bandpass filters and the noise estimation unit further comprises a plurality of noise estimation component adjusting means, each connected to a respective one of the plurality of tunable narrowband bandpass filter units and adjustable in response to a respective one of a plurality of second control signals to adjust the corresponding noise estimation signal component, the noise detection and control means further comprising means for generating said plurality of second control signals each in dependence upon a comparison between the common mode signal and the noise-suppressed output signal when the corresponding noise estimation component means is set to the corresponding selected frequency band.

8. Apparatus according to claim 7, wherein the means for generating the plurality of second control signals performs cross-correlation between the common mode signal and the noise-corrected output signal for each selected frequency band to determine whether or not residual differential noise is present in the noise-corrected output signal and adjusts the corresponding one of the plurality of second control signals so as to reduce any said residual noise.

9. Apparatus according to claim 7, wherein each of the means responsive to the second control signals comprises a variable-gain amplifier means for adjusting amplitude of the noise estimation signal component, and the noise estimation unit further comprises a plurality of phase-shifting means connected to respective ones of the tunable filters, each phase-shifting means for adjusting the phase of the corresponding noise estimation signal component in response to a respective one of a plurality of third control signals, the noise detection and control unit further comprising means for providing said plurality of third control signals each in dependence upon said comparison.

10. A method of suppressing noise in a signal received from a two-conductor communications channel comprising the steps of:
(i) using a hybrid device connected to the channel to provide a differential mode signal corresponding to a differential signal received from the channel,
(ii) extracting from the channel a corresponding common mode signal,
(iii) responsive to the common mode signal and a frequency control signal, deriving from the common mode signal a noise estimate signal representing a common mode noise level in a selected frequency band having a bandwidth considerably narrower than an operating bandwidth of said differential signal,
(iv) providing a noise-suppressed output signal as the difference between the differential mode signal and the noise estimate signal; and
(v) responsive to said common mode signal, detecting within the operating bandwidth a narrow frequency band wherein instant noise level is higher than in other parts of the operating bandwidth, such narrow frequency band having a bandwidth significantly less than an operating bandwidth of said differential signal, and generating said frequency control signal for adjusting said selected frequency band to correspond to that of the instant highest noise signal.

11. A method according to claim 10, wherein the noise estimation signal is adjusted in dependence upon a second control signal so as to correspond to differential mode noise in the differential mode signal, and the second control signal is generated in dependence upon a comparison between the common mode signal and the noise-suppressed output signal.

12. A method according to claim 11, wherein the second control signal is generated by performing cross-correlation between the common mode signal and the noise-corrected output signal to determine whether or not residual differential noise is present in the noise-corrected output signal, the second control signal then being adjusted so as to reduce any said residual noise.

13. A method according to claim 12, wherein the amplitude of the noise estimation signal is adjusted using a variable gain amplifier, and the noise estimation step includes the step of adjusting the phase of the noise estimation signal in response to a third control signal provided in dependence upon said comparison.

14. A method according to claim 12, wherein the adjusting of the amplitude of the noise estimation signal uses a variable gain amplifier, and the noise estimation step includes the step of adjusting the phase of the noise estimation signal in response to a third control signal provided in dependence upon said comparison.

15. A method of suppressing noise in a signal received from a two-conductor communications channel comprising the steps of:
(i) using a hybrid device connected to the channel, a differential mode signal corresponding to a differential signal received from the channel,
(ii) extracting from the channel a corresponding common mode signal,
(iii) responsive to the common mode signal and each of a plurality of frequency control signals, deriving a plurality of noise estimate signal components each representing a common mode noise level in a corresponding one of a plurality of selected frequency bands, each having a bandwidth considerably narrower than an operating bandwidth of said differential signal,
(iv) summing the noise estimate signal components to provide a noise estimate signal;
(v) providing a noise-suppressed output signal as the difference between the differential mode signal and the noise estimate signal; and
(vi) scanning the common mode signal over the operating bandwidth a plurality of times and detecting, for each scan, that narrow frequency band wherein instant noise level is higher than in other parts of the operating bandwidth, each such narrow frequency band having a bandwidth significantly less than an operating bandwidth of said differential signal, and generating for each scan one of said frequency control signals for adjusting the corresponding said selected frequency band to correspond to that of the instant highest noise signal, the arrangement being such that the plurality of noise estimate signal components are derived in succession.

16. A method according to claim 15, wherein the plurality of noise estimation signal components are derived using a plurality of tunable narrowband bandpass filters, respectively, the method further comprising the step of adjusting each of the tunable narrowband bandpass filters in response to a respective one of a plurality of second control signals each generated in dependence upon a comparison between the common mode signal and the noise-suppressed output signal when the corresponding noise estimate signal component has been applied to the differential signal in the corresponding selected frequency band.

17. A method according to claim 16, wherein the plurality of second control signals are each generated by performing cross-correlation between the common mode signal and the noise-corrected output signal to determine whether or not residual differential noise is present in the noise-corrected output signal and adjusting the second control signal so as to reduce any said residual noise.

18. A method according to claim 16, wherein the amplitude of each noise estimation signal component is adjusted using a variable gain amplifier, and the phase of the corresponding noise estimation signal component is adjusted in response to a respective one of a plurality of third control signals each generated in dependence upon said comparison.

* * * * *